United States Patent
Linander (10) Patent No.: US 7,110,419 B1
(45) Date of Patent: Sep. 19, 2006

(54) TECHNIQUE FOR USING ADDRESS FILTER PARAMETERS TO FACILITATE SIGN-ON PROCEDURES IN ACCESS NETWORKS

(75) Inventor: Stig Linander, Farum (DK)

(73) Assignee: Cisco Technology, Inc., San Jose, CA (US)

( * ) Notice: Subject to any disclaimer, the term of this patent is extended or adjusted under 35 U.S.C. 154(b) by 965 days.

(21) Appl. No.: 09/833,386

(22) Filed: Apr. 11, 2001

(51) Int. Cl.
   *H04J 1/00* (2006.01)
(52) U.S. Cl. .................................. 370/461; 370/488
(58) Field of Classification Search ........ 370/443–447, 370/448, 449, 488, 236, 458, 461–462; 340/852.52, 340/825
   See application file for complete search history.

(56) References Cited

U.S. PATENT DOCUMENTS

| | | | |
|---|---|---|---|
| 4,667,193 A * | 5/1987 | Cotie et al. | 340/825.52 |
| 4,868,816 A * | 9/1989 | Katsumata et al. | 370/449 |
| 5,572,517 A * | 11/1996 | Safadi | 370/431 |
| 5,926,476 A * | 7/1999 | Ghaibeh | 370/395.65 |
| 5,960,000 A * | 9/1999 | Ruszczyk et al. | 370/447 |
| 6,114,968 A * | 9/2000 | Ramakrishnan et al. | 340/3.51 |
| 2002/0080816 A1 * | 6/2002 | Spinar et al. | 370/449 |

OTHER PUBLICATIONS

Digital Video Broadcasting (DVE DVB Interaction Channel for Cable 1 Distribution Systems (CAT), ETSI ES 200 800 v1.2.1, European Broadcasting Union, 8 pages, printed on Mar. 16, 2001.

* cited by examiner

*Primary Examiner*—Huy D. Vu
*Assistant Examiner*—Blanche Wong
(74) *Attorney, Agent, or Firm*—Beyer Weaver & Thomas, LLP; Dean E. Wolf, Esq.

(57) ABSTRACT

A technique is disclosed for reducing collisions of signals occurring on at least one communication channel in an access network. The access network may include at least one Head End, and a plurality of network nodes. Each of the network node is configured to transmit signals to the Head End via the communication channel. Filter parameters are included in selected communication request messages transmitted to a first portion of nodes. According to specific embodiments, the filter parameters may be used to limit the number of responses to the communication request messages which are transmitted on the communication channel. In this way, by limiting the number of responses which may be transmitted at specified times over the communication channel, the likelihood of signal collisions occurring on the communication channel may be reduced.

42 Claims, 6 Drawing Sheets

TECHNIQUE FOR USING ADDRESS FILTER PARAMETERS TO FACILITATE SIGN-ON PROCEDURES IN ACCESS NETWORKS

BACKGROUND OF THE INVENTION

The present invention relates generally to digital computer network technology and more specifically to methods and apparatus for implementing improved sign-on procedures for nodes desiring to access the Head End of an access network.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

Figure 1:
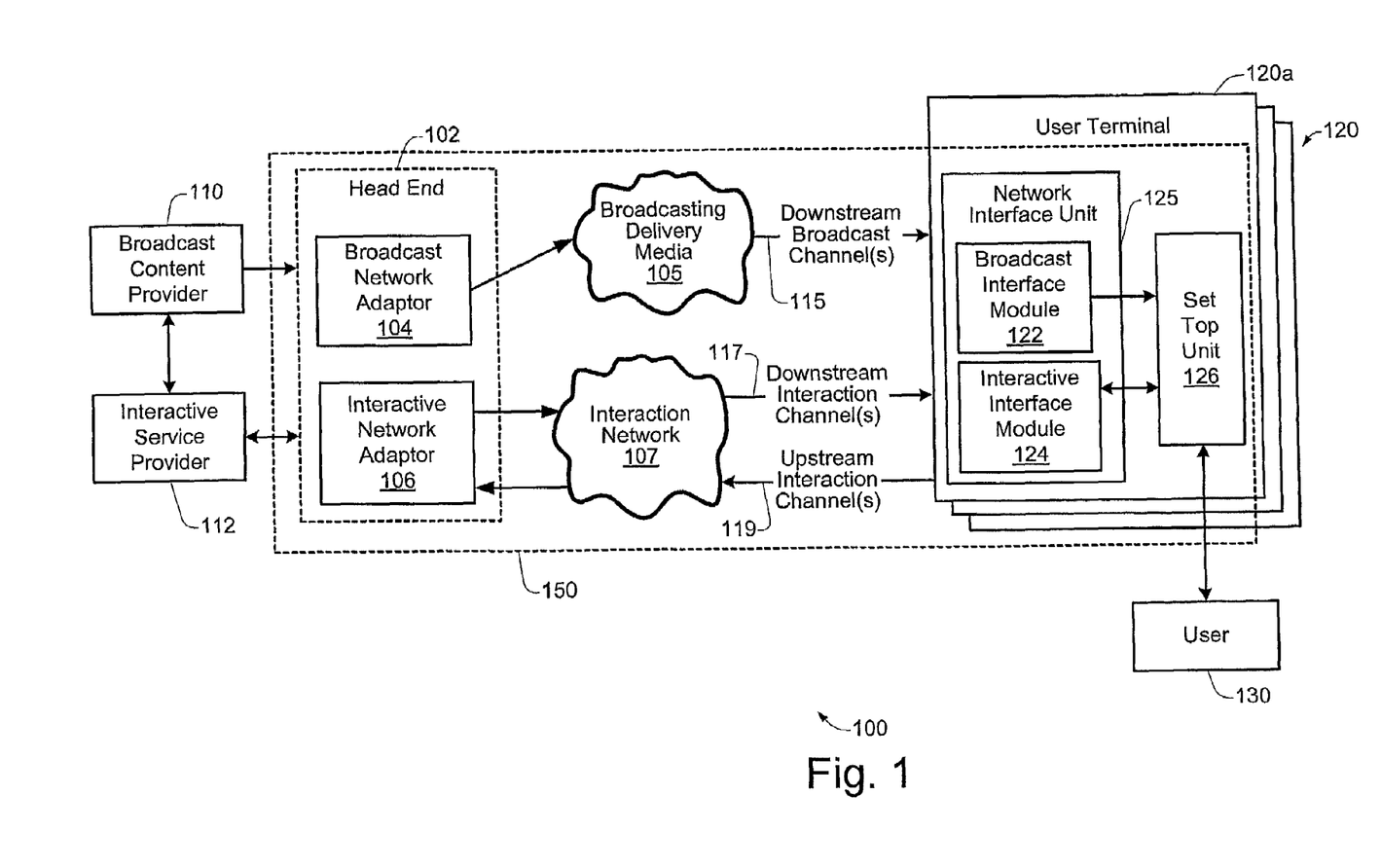
FIG. 1 shows a block diagram of a specific embodiment of an access network 100 which may be used for implementing the present invention.

One type of broadband access technology relates to digital video broadcasting (DVB) networks. An example of a conventional DVB network is shown in FIG. 1 of the drawings. As shown in FIG. 1, the DVB network 100 includes a Head End 102 which is configured to provide interactive services and communications with a plurality of network nodes or user terminals 120. In order to provide interactive network functionality, the Head End typically includes an interactive network adapter (INA) 106, whose functions are similar to the functions of a cable modem termination system (CMTS), which is located at the Head End of a cable network.

In order for data to be able to be transmitted effectively over a wide area network such as a DVB network or other broadband computer network, a common standard for data transmission is typically adopted by network providers. A commonly used and well known standard for implementing digital video broadcasting and interaction channels is the ETSI standard for Digital Video Broadcasting and DVB Interaction Channels For Cable Television Distribution Systems (herein referred to as the "ETSI standard"). The ETSI standard has been publicly presented by the European Broadcasting Union in a document entitled "ETSI ES 200 800 V1.2.1", on April, 2000. That document is incorporated herein by reference in its entirety for all purposes, and may be accessed via the worldwide web at www.etsi.org.

As shown in FIG. 1, the interactive network adapter 106 communicates with the plurality of user terminals 120 via at least one downstream interaction channel 117, and at least one upstream interaction channel 119. A plurality of different hardware and software components forming interaction network 107 provides the necessary infrastructure for enabling communication between the interactive network adapter (INA) 106 and the plurality of user terminals 120. The interactive network adapter 106 may also be used to communicate with an interactive service provider 112.

The downstream interaction channel(s) 117 provide a forward interaction path from a service provider to the user. These channels may be used to provide information by the service provider to the user, along with other required communications for the interactive service provision. In an alternate embodiment (not shown) the downstream interaction channels 117 may be embedded into the broadcast channels 115.

One or more upstream interaction channel(s) 119 provide a return interaction path from the user to the service provider. The upstream channels may be used to make requests to the service provider or to answer questions. Typically each upstream channel is configured as a narrow band channel, and is commonly referred to as a "return channel".

In the example of FIG. 1, the service provider may be considered to be the entity which controls portion 150 of the DVB network and provides interactive broadband access to the plurality of users. For example, the service provider which manages network portion 150 may correspond to a cable operator facility, and the network 150 may correspond to a cable network. The components of the interactive sub-system (e.g., 112, 106, 107, 117, 119, 124) of the DVB cable network 150 operate in a way that is comparable with the well-known DOCSIS protocol. The DOCSIS standard has been publicly presented by Cable Television Laboratories Inc. (Louisville, Colo.) in a document entitled, DOCSIS 1.1 RF Interface Specification (document control number SP-RFIv1.1-106-001215, Dec. 15, 2000). That document is incorporated herein by reference in its entirety for all purposes.

As show in FIG. 1, the Head End 102 may also include a broadcast network adapter 104 which forms part of a broadcast delivery system or channel for providing content to end users. The broadcast network adapter 104 may communicate with the plurality of user terminals 120 via one or more downstream broadcast channels 115. Typically, the downstream broadcast channels 115 are configured as unidirectional broadband broadcast channels suitable for carrying video, audio, and/or data signals from a broadcast content provider 110. According to a specific embodiment of the present invention, the components of the broadcast sub-system (e.g., 110, 104, 105, 115, 122) may correspond to a conventional one-way television broadcast network.

As shown in FIG. 1, each user terminal (e.g. 120a) comprises a network interface unit (NIU) 125 and a set top unit 126. The functions performed by the network interface unit 125 are similar to the functions performed by a cable modem residing in a DOCSIS cable modem network. In the example of FIG. 1, the user terminal 120a is configured to provide an interface for both broadcast and interaction channels. Accordingly, the network interface unit (NIU) may include a broadcast interface module 122 and an interactive interface module 124. In a specific implementation where the user terminal 120a is configured as an interactive set-top box, the interaction channels 117, 119 may be used for interactive TV programs. In a specific embodiment where the user terminal 120a is configured as a cable modem, the interactive portion of the DVB network 100 may correspond to an interactive cable network. In this latter embodiment, content from the broadcast content providers may be provided to the cable modems via the downstream interaction channels, and the broadcast channel 115 as well as other components of the broadcast subsystem may be omitted.

According to the ETSI standard, the interactive system 100 of FIG. 1 includes at least one forward interaction path (117) and at least one return interaction path (119). The general concept is to use downstream transmission from the INA 106 to the NIUs 125 to provide synchronization and information to all NIUs. This allows the NIUs to adapt to the network and send synchronized information upstream.

Upstream transmissions from the NIUs to the Head End are divided into multiple timeslots using the technique known as Time Division Multiple Access (TDMA). Each of these timeslots may be allocated for use by different network users. A counter at the INA is sent periodically to the NIUs, so that all NIUs work with the same clock. This gives the opportunity to the INA to assign timeslots to different users.

Typically, three types of access modes are used to allow NIUs to communicate with the INA. The first access mode is based on contention access, which lets users send information upstream during designated contention-based timeslots. During these contention-based timeslots, there is a risk that one or more collisions may occur with other users' transmissions. NIU sign-on operations are performed using contention-based timeslots (commonly referred to as Ranging slots). The second and third modes of access are non-contention based, where the INA either provides a finite amount of slots to a specific NIU, or provides a given bit rate requested by a NIU until the INA stops the connection. These access modes are dynamically shared among timeslots, which allows NIUs to know when contention based transmission is or is not allowed. This helps to avoid collisions for the two non-contention based access modes.

As part of the sign-on procedure described in the ETSI standard, the INA periodically sends Sign-On Request messages downstream to the NIUs. Any NIUs which wants to sign-on may reply to the Sign-On Request message by sending a Sign-On Response message upstream to the INA. However, since the Ranging timeslots allocated to the NIUs (for transmitting their Sign-On Response messages) are contention based, collisions will occur if more than one NIU transmits a Sign-On Response message during the same Ranging timeslot. Typically, when a collision occurs, the INA is unable to identify or decipher any of the Sign-On Response messages which were transmitted by the NIUs, and therefore will be unable to respond to any of the NIUs which sent the Sign-On Response messages.

When Sign-On Response message collisions occur, the corresponding NIUs are required to wait a randomized time interval before attempting to transmit another Sign-On Response message to the INA, thereby further delaying the sign-on process. Moreover, such delays increase as the number of NIUs attempting to sign-on to the DVB network increase. Thus, for example, if a network failure were to occur, the end users may experience significant disruptions in service as a result of the delays associated with the conventional NIU sign-on process.

Accordingly, it will be appreciated that there exists a continual need to improve access network protocols in order to better utilize network resources and minimize service disruptions and delays.

SUMMARY OF THE INVENTION

According to specific embodiments of the present invention, a method and computer program product are disclosed for reducing collisions of signals occurring on at least one communication channel in an access network. The access network may include at least one Head End, and a plurality of network nodes. Each of the network nodes is configured to transmit signals to the Head End via the communication channel. Filter parameters are included in selected communication request messages transmitted to a first portion of nodes. According to specific embodiments, the filter parameters may be used to limit the number of responses to the communication request messages which are transmitted on the communication channel. In this way, by limiting the number of responses which may be transmitted at specified times over the communication channel, the likelihood of signal collisions occurring on the communication channel may be reduced.

According to a specific embodiment, a first plurality of communication request messages may be transmitted to a first portion of nodes. Each of the first plurality of communication request messages include dynamically generated filter parameters. The dynamically generated filter parameters may be used to restrict the number of responses to any given communication request message by allowing only selected nodes respond to specific communication request messages. Each time a new communication request message is to be transmitted with filter parameters, the filter parameters may be dynamically modified in order to allow different groups of nodes to respond to the communication request message. Additionally, a second plurality of communication request messages are also transmitted to the first portion of nodes. The second plurality of communication request messages do not include filter parameters. According to a specific implementation, the communication request messages correspond to Sign-On Request messages transmitted by the Head End of a DVB network.

Another embodiment of the present invention is directed to a method for reducing collisions of signals occurring on at least one communication channel in an access network. The access network may include at least one Head End, and a plurality of network nodes. Each of the network nodes is configured to transmit signals to the Head End via the communication channel. A first communication request message is transmitted from the Head End to a first portion of nodes. The first communication request message includes filter parameters for restricting responses to the first communication request message to a first group of the first portion of nodes. The filter parameter values are then dynamically modified. A second communication request message is then transmitted from the Head End to the first portion of nodes. The second communication request message includes filter parameters for restricting responses to the second communication request message to a second group of the first portion of nodes.

A different embodiment of the present invention is directed to a system for reducing collisions of signals occurring on at least one communication channel in an access network. The access network may include at least one Head End, and a plurality of network nodes. Each of the network nodes is configured to transmit signals to the Head End via the communication channel. The system comprises at least one processor, memory, and at least one interface configured to provide at least one communication channel between the Head End and the plurality of network nodes. The system is configured to include filter parameters in selected communication request messages, which are transmitted to a first portion of nodes. According to specific embodiments, the filter parameters may be used to limit the number of responses to the communication request messages which are transmitted on the communication channel. In this way, by limiting the number of responses which may be transmitted at specified times over the communication channel, the likelihood of signal collisions occurring on the communication channel may be reduced.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

As multiple users increase to the thousands, contention and collisions during sign-on can choke the network. The technique of the present invention permits a back-off algorithm to be employed to minimize contention, thereby enhancing the robustness of the sign-on procedure.

According to specific embodiments, the present invention provides a number of different techniques for preventing collisions of Sign-On Response messages during times when several NIUs are attempting to sign-on at the same time. As described in greater detail below, one technique for reducing collisions of Sign-On Response messages is to utilize dynamically generated filer parameters, such as, for example, address filter parameters, when transmitting selected Sign-On Request messages to the NIUs to thereby restrict the number of NIUs which are allowed to transmit Sigh-On Response messages during specified Ranging slots.

Conventionally, address filter parameters have been used to direct specific NIUs to specific INAs within the DVB, cable, or other shared access networks. According to this conventional technique, static address filter parameters are associated with selected NIUs in the network. These static address filter parameters are then included in Sign-On Request messages transmitted to the NIUs. According to the ETSI standard, an NIU is permitted to respond to a Sign-On Request message which includes address filter parameters only if the NIU's MAC address matches the filter requirements specified by the address filter parameters in the Sign-On Request message. In this way, static load balancing may be performed whereby a first group of NIUs may be directed to respond to a first NIA in the network, and a second group of NIUs may be directed to respond to a second INA within the network.

In contrast to conventional techniques which utilize static address filter parameter values to perform static load balancing during NIU sign-on operations, the technique of the present invention teaches a novel use of address filter parameters, whereby dynamically generated address filter parameters are transmitted in selected Sign-On Request messages in order to reduce the chances of Sign-On Response collisions during NIU sign-on operations. Moreover, using the technique of the present invention, address filter parameters may be used to limit the number of NIUs or modems contending for access to the Head End at any given time.

Figure 2:
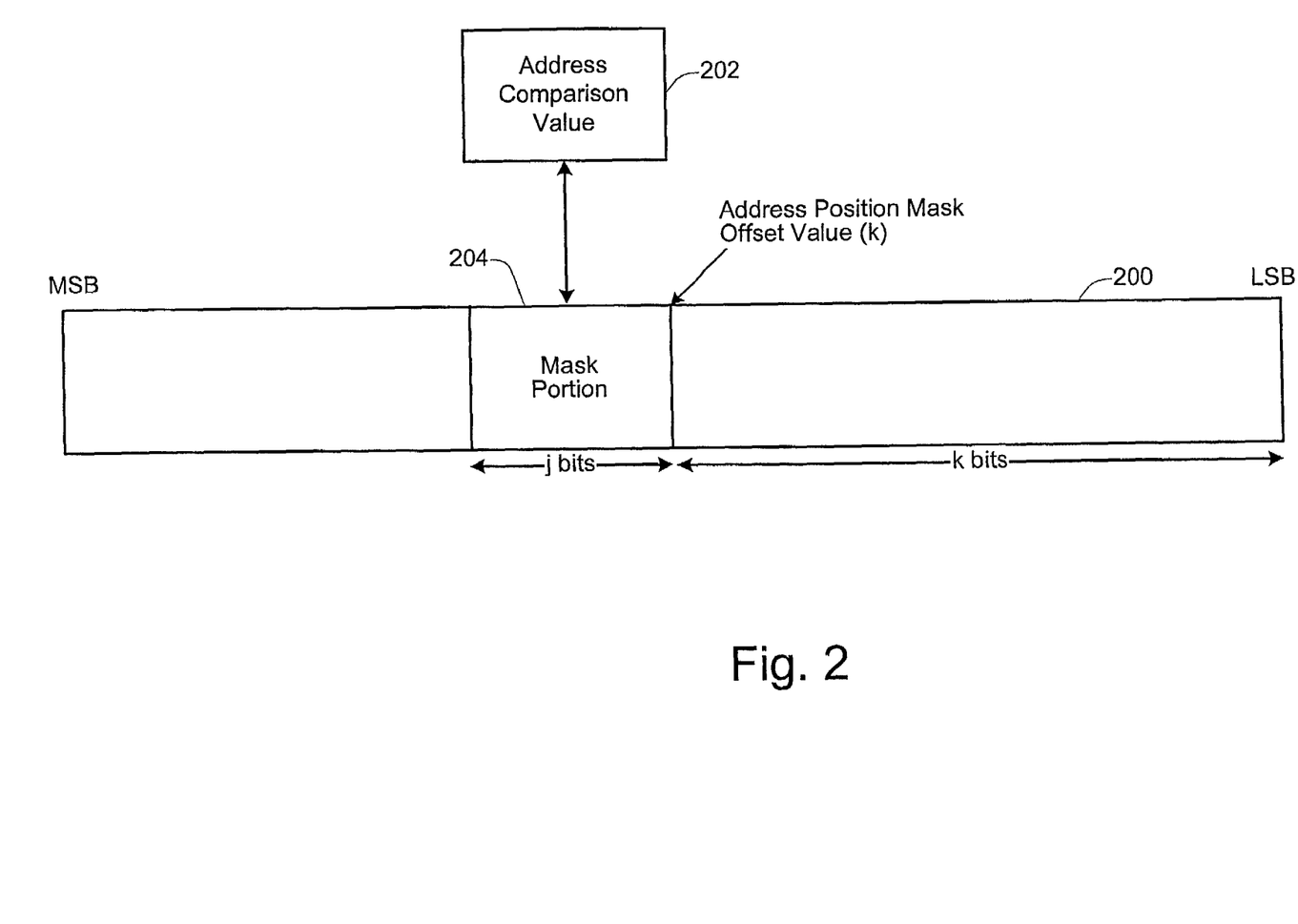
FIG. 2 shows a block diagram illustrating different address filter parameters which may be used for implementing a specific embodiment of the present invention.

FIG. 2 shows a block diagram illustrating different address filter parameters which may be used for implementing a specific embodiment of the present invention. As shown in FIG. 2, the address filter parameters may include an address position mask parameter and an address comparison value parameter. In according to a specific implementation, these filter parameters comply with the ETSI standard.

For example, according to the ETSI standard, the address position mask parameter may be used to indicate the bit positions in the NIU MAC address that are used for address filtering comparison. In the example of FIG. 2, the address position mask parameter is represented by the offset value k, which represents a number of bits in which the mask portion 204 is to be offset from the least significant bit (LSB) of the MAC address 200. According to the ETSI standard, the mask portion 204 is defined as an 8-bit portion of the MAC address whose bit values are compared against the bit values specified in the address comparison value parameter 202 (which is part of the address filter parameters). Thus, for example, an address position mask value of zero would correspond to the eight least significant bits of the NIU's MAC address. An address position mask value of 2 shifts the 8-bit mask portion left by two bits, and therefore corresponds to bits 2–9 (from LSB to MSB) of the NIU's MAC address.

According to the ETSI standard, the address comparison value parameter 202 is represented as an 8-bit unsigned integer which specifies the value that the NIU should use for MAC address comparison. For example, if the address position mask value is set equal to zero, and the address comparison value is set equal to zero, the least significant 8 bits of the MAC address 200 will be compared against the 8 bits of the address comparison value 202 (which, in this example is "0000000"). Accordingly, the specific address filter parameters of this example will correspond to NIUs whose least significant 8 bits of their MAC address are represented by all zeros.

It will be appreciated that, in alternate embodiments of the present invention (such as those, for example, which do not comply with the current ETSI standard), the specific configurations of the address position mask parameter and the address comparison value parameter may be modified as appropriate, and may be represented by any desired number of bits. Additionally, it will be appreciated that other types of filter parameters may be used in order to selectively filter out or restrict specific nodes in the access network. For example, filter parameters may be based on other identifiers such as IP address, Service Identifier (SID), etc. Such modifications will generally be known to one having ordinary skill in the art.

Figure 3:
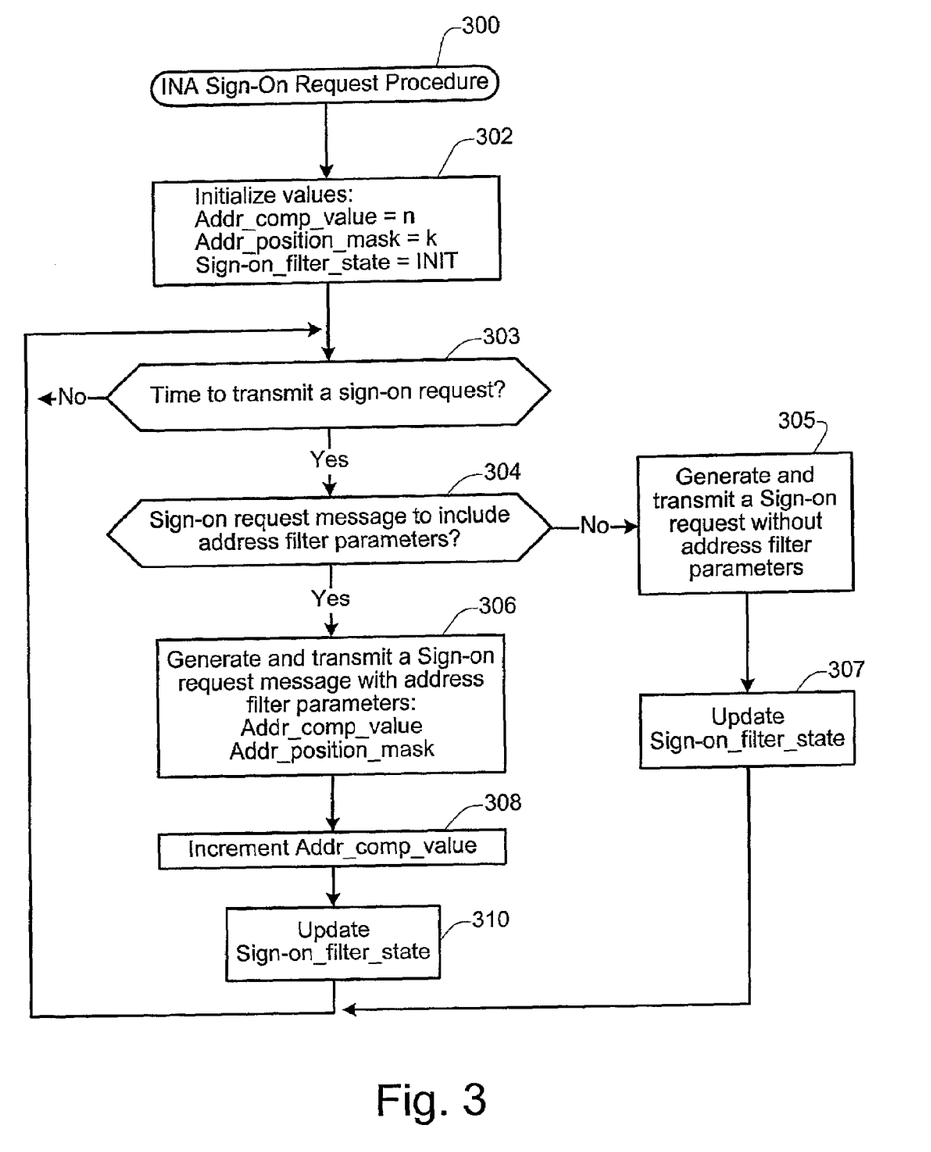
FIG. 3 shows a flow diagram of an INA Sign-On Request Procedure 300 in accordance with a specific embodiment of the present invention.

FIG. 3 shows a flow diagram of an INA Sign-On Request Procedure 300 in accordance with a specific embodiment of the present invention. According to a specific implementation, the Sign-On Request Procedure 300 may be implemented at the Head End of the DVB network.

As described in greater detail below, one function of the Sign-On Request Procedure 300 is to cause the INA to transmit Sign-On Request messages, wherein selected Sign-On Request messages include address filter parameters in order to limit the number of cable modems contending for access to the Head End at specified timeslots.

Initially, as shown at 302, the plurality of parameters may be initialized. For example, the address comparison value parameter (ADDR_COMP_VALUE) may be set equal to a particular value, n. According to a specific implementation, the value n may be set equal to an initial value such as, for example, 0 and then incremented as the Sign-On Response Procedure commences. Additionally, as shown at 302, the address position mask parameter (ADDR_POSITION_MASK) may be set equal to an initial value, k. According to a specific implementation, where the MAC address is represented as a 48-bit integer, the range of values for k may be set equal to any number between 0 and 40. According to one implementation, the value k is set equal to 0.

Additionally, as shown at 302, a Sign-On_Filter_State parameter may be initialized. According to a specific implementation, the Sign-On_Filter_State parameter may be used to keep track of the current state of the Sign-On Request Procedure 300 in order to determine whether the next transmitted Sign-On Request message should include address filter parameters.

At 303, the INA determines whether it is time to transmit a new Sign-On Request message. According to a specific implementation, the INA may transmit a new Sign-On Request message at fixed, periodic intervals, such as, for example, every 900 milliseconds.

Once the INA has determined that it is time to transmit a new Sign-On Request message, a determination is then made (304) as to whether the new Sign-On Request message is to include address filter parameters. According to a specific embodiment, the decision as to whether or not to include address filter parameters in the next Sign-On Request message may be based upon the Sign-On_Filter_State parameter.

According to a specific embodiment, the current state or value of the Sign-On_Filter_State parameter may be managed by a state machine such as, for example, a Sign-On_Filter_State machine. In accordance with the various embodiments of the present invention, there are a number of different ways to configure the Sign-On_Filter_State machine to indicate that address filter parameters are to be included in specific Sign-On Request messages. For example, in one implementation, the Sign-On_Filter_State machine may be configured so as to trigger the inclusion of address filter parameters in every m Sign-On Request messages transmitted, where m is an integer greater than or equal to one. For example, in an embodiment where m=2, the INA will include address filter parameters in every second Sign-On Request message transmitted. In a different embodiment where m=3, the NIA will include address filter parameters in every third Sign-On Request message transmitted.

According to an alternate embodiment, Sign-On_Filter_State machine may be configured to dynamically adjust the frequency of use of address filter parameters in Sign-On Request messages based upon the frequency of detected collisions measured during specified time periods. Such collisions may be detected by the INA, which may be configured to detect whether one or more collisions have occurred on any of the upstream channels. Using this information, the Sign-On_Filter_State machine may be configured to determine the frequency of collisions which occur on a particular upstream channel during a specific time interval T1.

According to a specific embodiment, the Sign-On_Filter_State variable may be implemented as a simple boolean function which toggles whenever the Sign-On_Filter_State variable is updated. This would result in every other Sign-On Request message being sent with address filter parameters, and every other Sign-On Request message to be sent without address filter parameters.

Alternatively, the Sign-On_Filter_State variable may also be configured as a more complex function. For example, the INA detects that the number of collisions in the upstream slot used for the sign-on process is below a threshold value, the frequency of the Sign-On Request messages with address filter parameters may be decreased. If, however, the INA detects that the number of collisions in the upstream slots used for sign-on purposes is above a threshold value, the frequency of Sign-On Request messages which include address filter parameters may be increased.

According to one embodiment, if the average number of collisions detected during the time interval T1 exceeds a predetermined threshold value, then the ratio of (1) Sign-On Request messages with filter parameters to (2) Sign-On Request messages without filter parameters may be increased. Conversely, if the average number of collisions detected over the time interval T1 is below a predetermined threshold value, then the ratio of (1) Sign-On Request messages with filter parameters to (2) Sign-On Request messages without filter parameters may be decreased. According to a specific implementation, the time period T1 may range, for example, from about 3 milliseconds to about 3 seconds. In a specific embodiment, the time period T1 may be set equal to about 900 milliseconds.

For example, if it is detected that collisions are occurring in at least one half of the timeslots which are used by the NIUs for transmitting Sign-On Response messages, then the ratio of Sign-On Request messages with filter parameters to Sign-On Request messages without filter parameters may be increased. If it is detected that collisions are occurring in less than half of the measured timeslots, but are occurring in at least one third of the measured timeslots, then the ratio of Sign-On Request messages with address filter parameters to Sign-On Request messages without address filter parameters may remain the same. If, however, the average number of collisions occurs in less than one third of the measured timeslots, then the ratio of Sign-On Request messages with address filter parameters to Sign-On Requests messages without address filter parameters may be decreased.

Returning to FIG. 3, if it is determined (304) that the next Sign-On Request message is not to include address filter parameters, then a next Sign-On Request message without address filter parameters is generated and transmitted (305) to the NIUs. Thereafter, the Sign-On_Filter_State machine may be updated (307). According to a specific embodiment, the Sign-On_Filter_State machine is configured to keep track of whether or not previous Sign-On Request messages includes address filter parameters. According to a specific implementation, when the Sign-On_Filter_State machine is updated, it will advance to a specific state which may then be used to determine whether the next Sign-On Request message is to include address filter parameters. Thus, for example, in the example of FIG. 3, the Sign-On_Filter_State machine may be updated (307) to indicate that the most recent Sign-On Request message transmitted did not include address filter parameters.

Returning to operation 304 of FIG. 3, if it is determined that the next Sign-On Request message is to include address filter parameters, then a new Sign-On Request message with address filter parameters is generated and transmitted (306) to the NIUs.

According to a specific embodiment, the address filter parameters included in the Sign-On Request message may include an address comparison value parameter (e.g., ADDR_COMP_VALUE) and an address position mask parameter (e.g., ADDR_POSITION_MASK), as described previously. In the example of FIG. 3, the ADDR_COMP_VALUE parameter value is equal to n, and the ADDR_POSITION_MASK parameter value is equal to k.

After the Sign-On Request message with the address filter parameters has been generated and transmitted to the NIUs, the ADDR_COMP_VALUE parameter may be incremented (308). According to a specific embodiment, the ADDR_COMP_VALUE parameter corresponds to the address comparison value parameter (e.g. 202, FIG. 2) which specifies the value which the NIU should use for its MAC address comparison. According to the ETSI standard, the specific group of NIUs which are allowed to respond to the Sign-On Request message is restricted to only those NIUs whose MAC addresses match the address filter parameters specified in the Sign-On Request message. When the address comparison value parameter is incremented, this will change the address filter parameter requirements, and result in a different group of NIUs (i.e. those matching the new address filter parameter requirements) being allowed to respond to a Sign-On Request message which includes the new address filter parameters.

At 310, the Sign-On_Filter_State machine may be updated to reflect that the most recent Sign-On Request message transmitted was one which included address filter parameters. According to a specific embodiment, the updating of the Sign-On_Filter_State machine at operation 310 may be different than the updating of the Sign-On_Filter_State machine performed at operation 307. Thereafter, the INA will wait until it is time to transmit a new Sign-On Request message.

According to the embodiment as shown in FIG. 3, each time a Sign-On Request message is transmitted with address filter parameters, the address comparison value parameter, n, is incremented (or, alternatively, decremented). Accordingly, it will be appreciated that new address filter parameter values will be generated each time the INA transmits a new Sign-On Request message which includes address filter parameters. Moreover, each new set of address parameter values will correspond to a different group of NIUs in the DVB network.

For example, where the ADDR_COMP_VALUE=0 and the ADDR_POSITION_MASK value=0, the NIUs which match these address filter parameter requirements will be those in which the least significant 8 bits of their MAC addresses each correspond to all zeroes. Thereafter, the next time a Sign-On Request message with address filter parameters is transmitted, the address comparison value parameter will have been incremented to ADDR_COMP_VALUE=1. These new address filter parameters (ADDR_COMP_VALUE=1 and ADDR_POSITION_MASK=0) correspond to a different group of NIUs whose least significant 8 bits of their MAC addresses are each "00000001".

In a specific embodiment, the address comparison value is represented as an 8-bit unsigned integer. Therefore, according to this specific embodiment, the address comparison value may be incremented 256 times before it is reset back to zero. Accordingly, up to 256 different groups of cable modems maybe selectively identified using the Sign-On Request Procedure 300 of FIG. 3, and an 8-bit address comparison value parameter. Additionally, if it is assumed, for example, that a Sign-On Request message with address filter parameters is sent every other time a Sign-On Request message is transmitted, it will take 512 Sign-On Request messages to complete one cycle.

Figure 4:
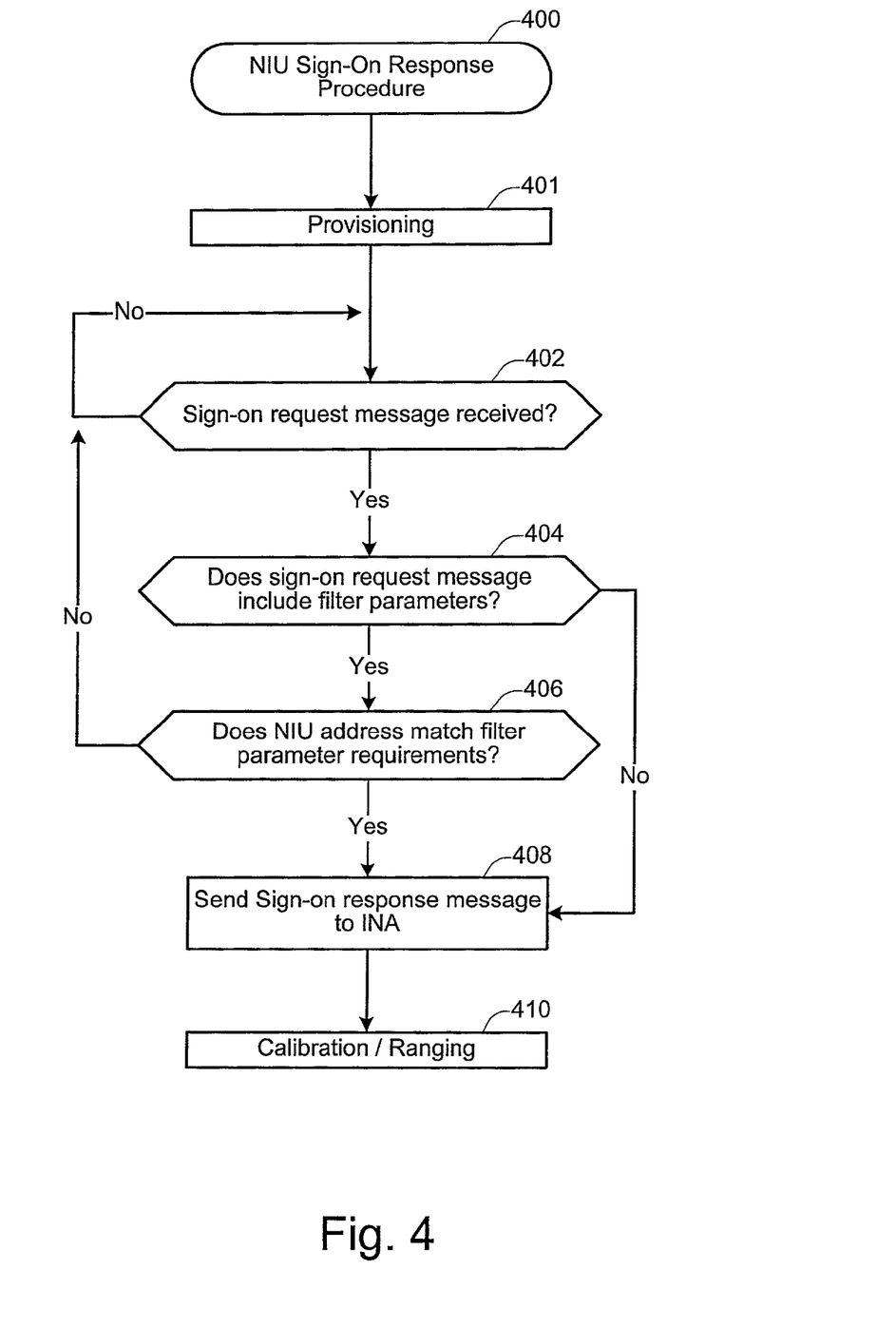
FIG. 4 shows a flow diagram of a NIU Sign-On Response Procedure 400 in accordance with a specific embodiment of the present invention.

FIG. 4 shows a flow diagram of a NIU Sign-On Response Procedure 400 in accordance with a specific embodiment of the present invention. According to one embodiment, the Sign-On Response Procedure 400 may be implemented at each or selected NIUs in the DVB network as part of the general NIU sign-on procedure.

Typically, when a new NIU desired to join the DVB network, the NIU may initially perform (401) provisioning operations. Such provisioning operations are generally known to those having ordinary skill in the art and are described in greater detail in the ETSI standard.

After provisioning operations have been completed, the NIU determines (402) whether a Sign-On Request message has been received. If a Sign-On Request message has been received at the NIU, the NIU then determines (404) whether the received Sign-On Request message includes address filter parameters. If the Sign-On Request message does not include address filter parameter requirements, then the NIU may transmit (408) a Sign-On Response message to the INA at a designated timeslot specified by the Sign-On Response message. After receiving an acknowledgement from the INA, the NIU may then proceed to perform (410) calibration/ranging operations.

If, however, the received Sign-On Request message does include address filter parameters, then a determination is made (406) as to whether the NIU's MAC address matches the filter parameter requirements specified in the Sign-On Request message. If the MAC address of the NIU does not match the filter parameter requirements, then no Sign-On Response message is transmitted to the INA, and the NIU waits to receive another Sign-On Request message from the NIA. If, however, the MAC address of the NIU matches the filter parameter requirements specified in the Sign-On Request message, then the NIU may transmit (408) a Sign-On Response message to the INA at the designated timeslot.

It will be appreciated that in alternate embodiments of the present invention other types of filtering techniques and/or parameters may be used to selectively restrict access to specific contention-based channels and/or timeslots used for performing sign-on or registration operations between the NIUs and the Head End.

According to a specific embodiment, the technique of the present invention may also be implemented in other access networks such as, for example, networks which have been configured according to the well-known DAVIC standard, and the well-known DOCSIS standard.

Head End Configurations

Generally, the NIU sign-on technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Interactive Network Adaptor (INA). Preferably, the INA is a "routing" INA, which handles at least some routing functions. Alternatively, the INA may be a "bridging" INA, which handles only lower-level tasks.

Figure 5:
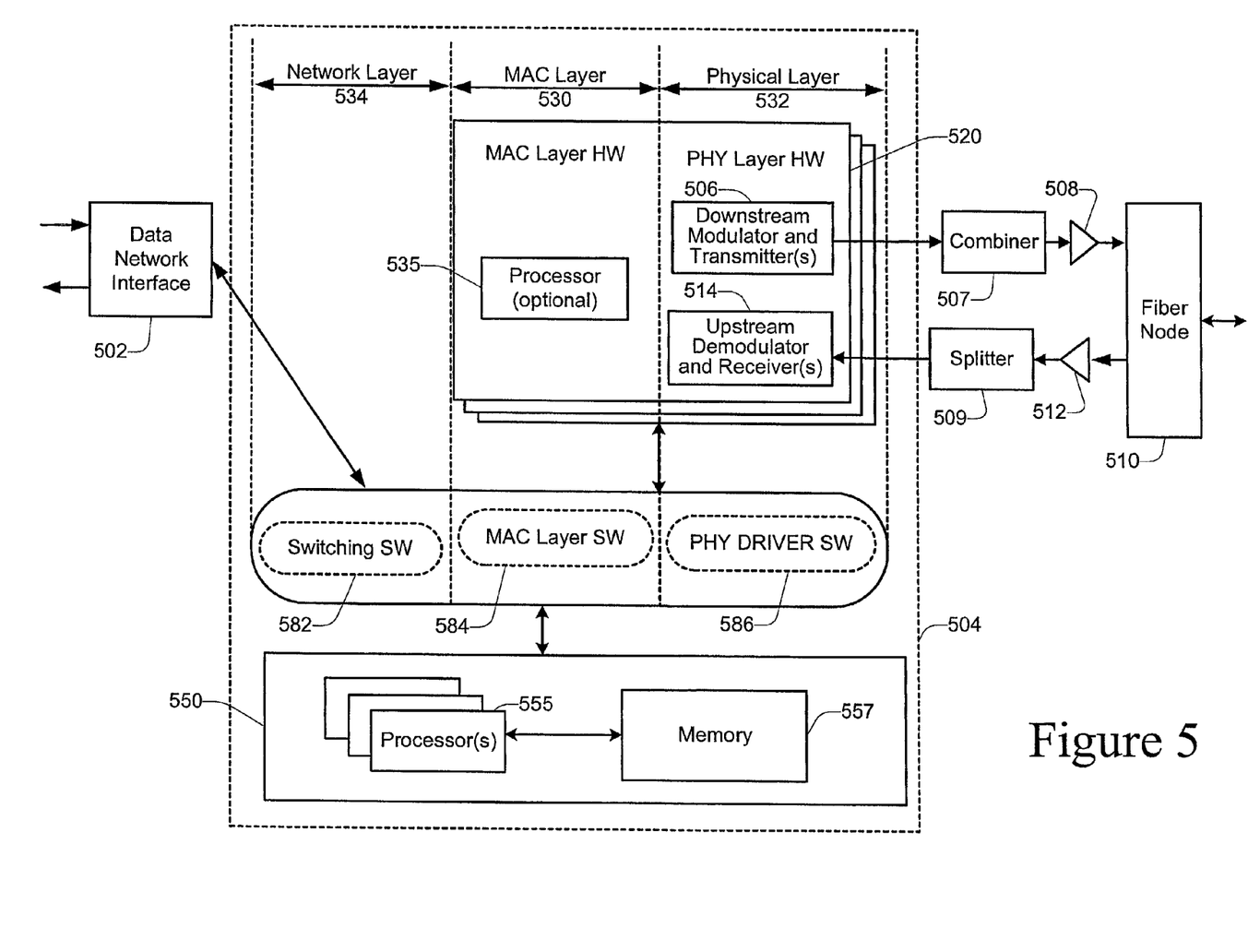
FIG. 5 provides an example of some components of an INA that may be used to implement certain aspects of this invention.

FIG. 5 provides an example of some components of an INA that may be used to implement certain aspects of this invention. In the specific embodiment as shown in FIG. 5, an INA 504 provides functions on three network layers including a physical layer 532, a Media Access Control (MAC) layer 530, and a network layer 534. Generally, the physical layer is responsible for receiving and transmitting RF signals on the cable plant. Hardware portions of the physical layer include at least one downstream modulator and transmitter 506 and/or at least one upstream demodulator and receiver 514. The physical layer also includes software 586 for driving the hardware components of the physical layer.

Upstream optical data signals (packets) arriving via an optical fiber node 510 are converted to electrical signals by a receiver 512. Additionally, the upstream information packet (RF electrical signals) is demodulated by the demodulator/receiver 514 and then passed to MAC layer portion 530.

A primary purpose of MAC layer 530 is to encapsulate, with MAC headers, downstream packets and decapsulate, of MAC headers, upstream packets. In one embodiment, the encapsulation and decapsulation proceed as dictated by the above-mentioned DVB standard for transmission of data or other information. The MAC headers of packages sent downstream may include a MAC address identifying a specific NIU to receive the packet. The MAC headers of packages sent upstream typically include a MAC address identifying the NIU transmitting the packet.

According to a specific embodiment, the MAC layer block 530 includes a MAC layer hardware portion and a MAC layer software portion. The MAC layer hardware portion may include at least one processor 535. According to a specific implementation, the processor 535 may be configured to perform functions relating to MAC layer operations, etc. The MAC layer software portion may include software relating to DVB MAC layer functionality, filter parameter state machine functionality, NIU sign-on operations, etc. The MAC layer hardware and software portions operate together to provide the above-described functionality. In a preferred embodiment, the processor 535 is distinct from the router's general-purpose microprocessor and is dedicated to performing some MAC layer functions.

In specific INA configurations, the hardware portions of the physical layer 532 and MAC layer 530 reside on physical line cards 520 within the INA. The INA may include a plurality of distinct line cards which service particular NIUs in the network. Each line card may be configured to have its own unique hardware portions of the physical layer 532 and MAC layer 530.

After MAC layer block 530 has processed the upstream information, it is then passed to network layer block 534. Network layer block 534 includes switching software 582 for causing the upstream information packet to be switched to an appropriate data network interface on data network interface 502. When a packet is received at the data network interface 502 from an external source, the switching software within network layer 534 passes the packet to MAC layer 530. MAC block 504 then transmits information via a one-way communication medium to downstream modulator and transmitter 506. Downstream modulator and transmitter 506 takes the data (or other information) in a packet structure and converts it to modulated downstream frames, such as MPEG or ATM frames, on the downstream carrier using, for example, QAM64 modulation. Other methods of modulation may also be used such as, for example, QAM256 modulation, CDMA (Code Division Multiple Access), OFDM (Orthogonal Frequency Division Multiplexing), FSK (FREQ Shift Keying), etc. The return data is likewise modulated using, for example, QAM16 or QSPK. According to a specific embodiment, the modulated data is converted from IF electrical signals to RF electrical signals (or vice-versa) using one or more electrical signal converters (not shown). Data from other services (e.g. television) may be added at a combiner 507. An optical converter 508 converts the modulated RF electrical signals to optical signals that can be received and transmitted via Fiber Node 510 to the NIU hub.

Note that alternate embodiments of the INA (not shown) may not include network layer 534. In such embodiments, an INA device may include only a physical layer and a MAC layer, which are responsible for modifying a packet according to the appropriate standard for transmission of information over a DVB network. The network layer 534 of these alternate embodiments of INA devices may be included, for example, as part of a conventional router for a packet-switched network. In a specific embodiment, the network layer of the INA is configured as a cable line card coupled to a standard router that includes the physical layer block 532 and MAC layer block 530. Using this type of configuration, the INA is able to send and/or receive IP packets to and from the data network interface 502 using switching software block 582.

The data network interface 502 is an interface component between external data sources and the cable system. The external data sources transmit data to the data network interface 502 via, for example, optical fiber, microwave link, satellite link, or through various media. The data network interface includes hardware and software for interfacing to various networks such as, for example, Ethernet, ATM, frame relay, etc.

As shown in FIG. 5, INA 504 includes a central hardware block 550 including one or more processors 555 and memory 557. These hardware components interact with software and other hardware portions of the various layers within the INA. They provide general purpose computing power for much of the software. Memory 557 may include, for example, I/O memory (e.g. buffers), program memory, shared memory, etc. One or more data structures used for implementing the technique of the present invention may reside in such memory. Hardware block 550 may physically reside with the other INA components. In one embodiment, the software entities 582, 584, and 586 are implemented as part of a network operating system running on hardware 550. Preferably, at least a part of the NIU sign-on functionality of this invention are implemented in software as part of the operating system. In FIG. 5, such software may be part of MAC layer software 584 and/or the switching software 582, or may be closely associated therewith. Of course, the NIU sign-on logic of the present invention could reside in hardware, software, or some combination of the two.

The procedures employed by the INA during registration and pre-registration are preferably performed at the MAC layer of the INA logic. Thus, in INA 504, most of the registration operations would be performed by the hardware and software provided for MAC layer logic 530.

The operations associated with obtaining an IP address for NIUs are preferably implemented at the network layer level 534. As noted, this may involve the INA communicating with a DHCP server (not shown) via data network interface 502, for example.

The NIU sign-on techniques of the present invention may be implemented on various general purpose Interactive Network Adaptors. In a specific embodiment, the systems of this invention may be specially configured INAs such as, for example, specially configured models in the uBR-7200 series of INAs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 5 represents one specific INA architecture of the present invention, it is by no means the only INA architecture on which the present invention can be implemented. For example, other types of interfaces and media could also be used with the INA.

Regardless of network device's configuration (for cable plants or otherwise), it may employ one or more memories or memory modules (e.g., memory 557) configured to store program instructions for the network operations and other functions of the present invention described herein. The program instructions may specify an operating system and one or more applications, for example. Such memory or memories may also be configured to store data structures for storing filter parameter values, state data relating to the Sign-On_Filter_State machine, or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

It will be appreciated by one having ordinary skill in the art that the technique of the present invention may be implemented in any computer network having a standardized protocol for utilizing a central termination system (e.g. Head End) to schedule timeslots for remote stations or nodes on a return (or upstream) channel. In wireless networks, the central termination system may be referred to as a Head End or wireless base station. In satellite networks, the central termination system may be referred to as a master controlling station.

OTHER EMBODIMENTS

While the discussion to this point has focused on NIU sign-on techniques for DVB networks, the technology of the present invention may be applied to any access or shared-access network having a plurality of hosts or nodes which share at least one channel for communicating with at least one "Head End" in the network. Examples of shared-access networks include, in addition to DVB networks, wireless networks, Ethernet, FastEthernet, GigabitEthernet, LANs, etc. In the cable network, the plurality of nodes represents a plurality of NIUs that communicate with at least one INA at the centralized termination system using at least one shared-access upstream and downstream channel.

In general, the methods and apparatus described above may be implemented on a traffic handling device (e.g., a switch or router) for providing NIU sign-on capability in a network having at least one traffic handling device (e.g., another switch or router) that provides normal service to a host. In the wireless system (e.g., represented by FIG. 6) the plurality of nodes or hosts corresponds to the plurality of wireless nodes 650 which use at least one shared access channel to communicate with at least one access control system 622 located at the Head End of the wireless system.

Figure 6:
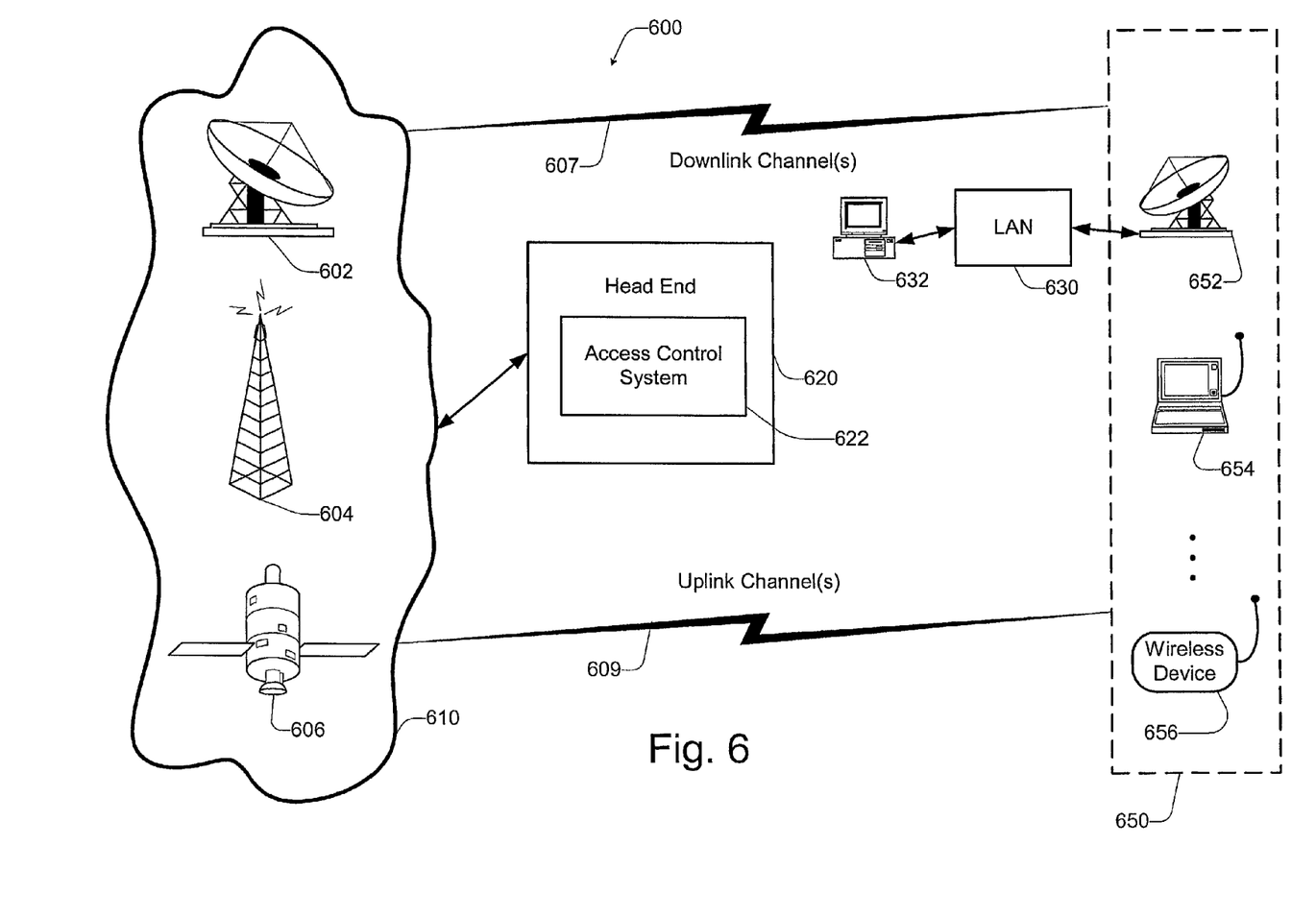
FIG. 6 shows an example of a wireless data communication system 600 which may be used for implementing the technique of the present invention.

FIG. 6 shows an example of a wireless data communication system 600 which may be used for implementing the technique of the present invention. As shown in FIG. 6, the wireless system includes a central termination system (or Head End) 620. The Head End includes an access controller or access control system (ACS) 622 which communicates with a plurality of wireless nodes 650, and coordinates access between each of the wireless nodes and the Head End 620. The access controller 622 may include memory and at least one processor. In a specific embodiment, the function of the access controller 622 is analogous to that of the INA described above with respect to DVB networks. It may serve as a router or switch as well.

The Head End 620 communicates with a plurality of wireless nodes 650 via any one of a plurality of wireless transmitting and receiving devices 610. As shown in FIG. 6, for example, the plurality of wireless transmitting and receiving devices 610 may include satellite base stations 602, orbital satellites 606, radio towers 604, etc.

In a specific embodiment which is analogous to that of DVB networks, the Head End 620 of the wireless computer system communicates with the plurality of nodes 650 via one or more downlink channels 607 and one or more uplink channels 609. Each downlink channel 607 is a broadcast-type channel utilized by the Head End to communicate with an associated group of wireless nodes within the wireless network. The uplink channel 609 is a shared-access channel, which is utilized by a group of wireless nodes (analogous to NIUs) to communicate with the Head End 620. The access controller 622 stores registration parameters for the various nodes that it services. It may also store the IP addresses for nodes that it services.

In a specific embodiment of the present invention, the registration process and information is similar to that of the cable network INAs described above. Moreover, the technique of the present invention for NIU sign-on capability over a shared access data network may be implemented in wireless system 600.

The wireless devices or nodes 650 may include any one of a number of wireless transmitting/receiving devices. For example, a satellite dish 652 may be used to communicate with the Head End 620 via the uplink and downlink channels. The satellite dish may, in turn, be connected to a local area network (LAN) 630 which, may be further connected to one or more computer systems 632. Another wireless device may be a portable/wireless computer system 654, which is able to transmit and receive information to the Head End via uplink and downlink channels 607 and 609. Other wireless devices 656 may include, for example, wireless telephones, handheld computing devices, etc.

In specific embodiments where the uplink and downlink channels within the wireless system 600 are utilized in a manner similar to that of the upstream and downstream channels of a DVB network, the above-described NIU sign-on techniques may easily be implemented in wireless system 600 using the detailed description of the present invention provided herein. Moreover, the technique of the present invention may be easily implemented in any computer network which uses shared access channels for communicating between a centralized computing system and one or more remote nodes.

It will be appreciated that the technique of the present invention is not limited to DVB networks, and may be applied to any access data network which uses at least one shared access communication channel to communicate between a plurality of nodes in the network and a Head End of the network.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for reducing collisions of signals occurring on at least one communication channel in an access network, the access network including at least one Head End and a plurality of network nodes, the signals being transmitted by different nodes over the communication channel, the method comprising:
   transmitting a first plurality of communication request messages to a first portion of nodes, wherein the first plurality of communication request messages do not include filter parameters for restricting responses to the first plurality of communication request messages; and
   transmitting a second plurality of communication request messages to the first portion of nodes, wherein the second plurality of communication request messages each include filter parameters for restricting a number of responses to the second plurality of communication request messages;
   wherein the filter parameters include an address comparison value parameter which specifies a particular value to be used by each of the first portion of nodes for performing address comparison.

2. The method of claim 1, wherein at least a portion of the filter parameters are dynamically generated, the method further comprising:
   determining a time to transmit a next communication request message to the first portion of nodes; and
   determining whether the next communication request message is to include filter parameters for restricting responses to the next communication request message.

3. The method of claim 1, wherein at least a portion of the filter parameters are dynamically generated, the method further comprising determining whether a next communication request message is to include filter parameters based upon a number of collisions detected on the communication channel during a predetermined time interval.

4. A method for reducing collisions of signals occurring on at least one communication channel in an access network, the access network including at least one Head End and a plurality of network nodes, the signals being transmitted by different nodes over the communication channel, the method comprising:
   transmitting a first plurality of communication request messages to a first portion of nodes, wherein the first plurality of communication request messages do not include filter parameters for restricting responses to the first plurality of communication request messages;
   transmitting a second plurality of communication request messages to the first portion of nodes, wherein the second plurality of communication request messages each include filter parameters for restricting a number of responses to the second plurality of communication request messages; and
   determining whether a next communication request message is to include filter parameters based upon whether a selected number of previously transmitted communication request messages included filter parameters.

5. A method for reducing collisions of signals occurring on at least one communication channel in an access network, the access network including at least one Head End and a plurality of network nodes, the signals being transmitted by different nodes over the communication channel, the method comprising:
   transmitting a first plurality of communication request messages to a first portion of nodes, wherein the first plurality of communication request messages do not include filter parameters for restricting responses to the first plurality of communication request messages;
   transmitting a second plurality of communication request messages to the first portion of nodes, wherein the second plurality of communication request messages each include filter parameters for restricting a number of responses to the second plurality of communication request messages;
   increasing a transmission ratio of (a) communication request messages which include filter parameters to (b) communication request messages which do not include filter parameters based upon a determination that a number of collisions detected on the communication channel during a predetermined time interval is greater than a first predetermined threshold value; and
   decreasing a transmission ratio of (a) communication request messages which include filter parameters to (b) communication request messages which do not include filter parameters based upon a determination that a number of collisions detected on the communication channel during the predetermined time interval is less than a second predetermined threshold value.

6. The method of claim 1 further comprising transmitting communication request messages to the first portion of nodes, wherein every other communication request message includes the filter parameters.

7. A method for reducing collisions of signals occurring on at least one communication channel in an access network, the access network including at least one Head End and a plurality of network nodes, the signals being transmitted by different nodes over the communication channel, the method comprising:
   using filter parameters in selected communication request messages transmitted to a first portion of nodes to thereby limit a number of responses to the communication request messages; and
   dynamically changing the filter parameters each time a new communication request message which includes filter parameters is transmitted to the first portion of nodes.

8. A method for reducing collisions of signals occurring on at least one communication channel in an access network, the access network including at least one Head End and a plurality of network nodes, the signals being transmitted by different nodes over the communication channel, the method comprising:
   transmitting a first plurality of communication request messages to a first portion of nodes, wherein the first plurality of communication request messages do not include filter parameters for restricting responses to the first plurality of communication request messages;

transmitting a second plurality of communication request messages to the first portion of nodes, wherein the second plurality of communication request messages each include filter parameters for restricting a number of responses to the second plurality of communication request messages; and maintaining state information relating to previously transmitted communication request messages which have been transmitted;

said state information including information relating to whether selected previous communication request messages included filter parameters.

9. A method for reducing collisions of signals occurring on at least one communication channel in an access network, the access network including at least one Head End and a plurality of network nodes, the signals being transmitted by different nodes over the communication channel, the method comprising:

using filter parameters in selected communication request messages transmitted to a first portion of nodes to thereby limit a number of responses to the communication request messages; and wherein the access network corresponds to a Digital Video Broadcasting (DVB) network, the communication request message corresponds to a Sign-on Request message transmitted from an interactive network adaptor (INA) to at least one network interface unit (NIU), and the filter parameters correspond to address filter parameters.

10. The method of claim 9 further comprising using address filter parameters in Sign-On request messages to reduce numbers of NIUs contending for access to the Head End via the communication channel.

11. The method of claim 9 further comprising using address filter parameters in Sign-On Request messages to prevent selected groups of NIUs from being able to respond to the Sign-On Request messages in order to reduce chances of at least one Sign-On Response message collision on the communication channel.

12. The method of claim 1 wherein the communication channel is contention-based.

13. The method of claim 1 wherein the communication channel is configured to utilize a Time Division Multiple Access communication protocol, and wherein at least a portion of timeslots of the communication channel are contention-based.

14. A system for reducing collisions of signals occurring on at least one communication channel in an access network, the access network including at least one Head End and a plurality of network nodes, the signals being transmitted by different nodes over the communication channel, the system comprising:

at least one processor;

memory; and at least one interface configured to provide at least one communication channel between the Head End and the plurality of network nodes;

the system being configured or designed to transmit a first plurality of communication request messages to a fist portion of nodes, wherein the first plurality of communication request messages do not include filter parameters for restricting responses to the first plurality of communication request messages; and the system being further configured or designed to transmit a second plurality of communication request messages to the first portion of nodes, wherein the second plurality of communication request messages each include filter parameters for restricting a number of responses to the second plurality of communication request messages.

15. The system of claim 14:

wherein at least a portion of the filter parameters are dynamically generated;

wherein the system is further configured or designed to determine a time to transit a next communication request message to the first portion of nodes; and wherein the system is further configured or designed to determine whether the next communication request message is to include filter parameters for restricting responses to the next communication request message.

16. The system of claim 14:

wherein at least a portion of the filter parameters are dynamically generated; and wherein the system is further configured or designed to determine whether the next communication request message is to include dynamically generated filter parameters based upon a number of collisions detected on the communication channel during a predetermined time interval.

17. The system of claim 14:

wherein at least a portion of the filter parameters are dynamically generated; and wherein the system is further configured or designed to determine whether the next communication request message is to include filter parameters based upon whether a selected number of previously transmitted communication request messages included filter parameters.

18. The system of claim 14:

wherein the system is further configured or designed to increase a transmission ratio of (a) communication request messages which include filter parameters to (b) communication request messages which do not include filter parameters based upon a determination that a number of collisions detected on the communication channel during a predetermined time interval is greater than a first predetermined threshold value; and wherein the system is further configured or designed to decrease a transmission ratio of (a) communication request messages which include filter parameters to (b) communication request messages which do not include filter parameters based upon a determination that a number of collisions detected on the communication channel during the predetermined time interval is less than a second predetermined threshold value.

19. The system of claim 14 wherein the system is further configured or designed to transmit communication request messages to the first portion of nodes; and wherein every other communication request message includes the filter parameters.

20. The system of claim 14 wherein the filter parameters include an address comparison value parameter which specifies a particular value to be used by each of the first portion of nodes for performing address comparison.

21. A system for reducing collisions of signals occurring on at least one communication channel in an access network, the access network including at least one Head End and a plurality of network nodes, the signals being transmitted by different nodes over the communication channel, the system comprising:

at least processor;

memory; and at least one interface configured to provide at least one communication channel between the Head End and the plurality of network nodes;

the system being configured or designed to use filter parameters in selected communication request messages transmitted to a first portion of nodes to thereby limit a number of responses to the selected communication request messages;

the system being further configured or designed to dynamically change the filter parameters each time a new communication request message which includes filter parameters is transmitted to the first portion of nodes.

22. The system of claim 14:

wherein the processor is configured to store into the memory state information relating to previously transmitted communication request messages which have been transmitted; and wherein said state information includes information relating to whether selected previous communication request messages included filter parameters.

23. A system for reducing collisions of signals occurring on at least one communication channel in an access network, the access network including at least one Head End and a plurality of network nodes, the signals being transmitted by different nodes over the communication channel, the system comprising:

at least one processor;

memory; and at least one interface configured to provide at least one communication channel between the Head End and the plurality of network nodes;

the system being configured or designed to use filter parameters in selected communication request messages transmitted to a first portion of nodes to thereby limit a number of responses to the selected communication request messages;

wherein the access network corresponds to a Digital Video Broadcasting (DVB) network;

the system includes the interactive network adaptor (INA);

wherein a first request message of the selected communication request messages corresponds to a Sign-on Request message transmitted from an interactive network adaptor (INA) to at least one network interface unit (NIU);

and wherein the filter parameters correspond to address filter parameters.

24. The system of claim 23 wherein the system is further configured or designed to use address filter parameters in Sign-On request messages to reduce numbers of NIUs contending for access to the Head End via the communication channel.

25. The system of claim 23 wherein the system is further configured or designed to use address filter parameters in Sign-On Request messages to prevent selected groups of NIUs from being able to respond to the Sign-On Request messages in order to reduce chances of at least one Sign-On Response message collision on the communication channel.

26. The system of claim 14 wherein the communication channel is contention-based.

27. The system of claim 14 wherein the communication channel is configured to utilize a Time Division Multiple Access communication protocol, and wherein at least a portion of timeslots of the communication channel are contention-based.

28. The system of claim 14 wherein the system is further configured or designed to transmit a first communication request message from the Head End to a first portion of the plurality of nodes, the first communication request message including filter parameters for restricting responses to the first communication request to a first group of the fast portion of nodes;

the system being further configured or designed to dynamically modify values associated with the filter parameters; and the system being further configured or designed to transmit a second communication request message from the Head End to the first portion of the plurality of nodes, the second communication request message including the modified filter parameters for restrict responses to the second communication request to a second group of the first portion of nodes.

29. A system for reducing collisions of signals occurring on at least one communication channel in an access network, the access network including at least one Head End and a plurality of network nodes the signals being transmitted by different nodes over the communication channel, the system comprising:

means for transmitting a first plurality of communication request messages to a first portion of nodes, wherein the first plurality of communication request messages do not include filter parameters for restricting responses to the first plurality of communication request messages; and means for transmitting a second plurality of communication request messages to the first portion of nodes, wherein the second plurality of communication request messages each include filter parameters for restricting a number of responses to the second plurality of communication request messages.

30. The system of claim 29 wherein at least a portion of the filter parameters are dynamically generated, the system further comprising:

means for determining a time to transmit a next communication request message to the first portion of nodes; and means for determining whether the next communication request message is to include filter parameters for restricting responses to the next communication request message.

31. The system of claim 29 further comprising means for determining whether the next communication request message is to include filter parameters based upon a number of collisions detected on the communication channel during a predetermined time interval.

32. The system of claim 29 further comprising means for determining whether the next communication request message is to include filter parameters based upon whether a selected number of previously transmitted communication request messages included filter parameters.

33. The system of claim 29 further comprising:

means for increasing a transmission ratio of (a) communication request messages which include filter parameters to (b) communication request messages which do not include filter parameters based upon a determination that a number of collisions detected on the communication channel during a predetermined time interval is greater than a first predetermined threshold value; and means for decreasing a transmission ratio of (a) communication request messages which include filter parameters to (b) communication request messages which do not include filter parameters based upon a determination that a number of collisions detected on the communication channel during the predetermined time interval is less than a second predetermined threshold value.

34. The system of claim 29 further comprising means for transmitting communication request messages to the first portion of nodes, wherein every other communication request message includes the filter parameters.

35. The system of claim 29 wherein the filter parameters include an address comparison value parameter which specifies a particular value to be used by each of the first portion of nodes for performing address comparison.

36. The system of claim 29 further comprising means for dynamically changing the filter parameters each time a new communication request message which includes filter parameters is transmitted to the first portion of nodes.

37. The system of claim 29 further comprising:
means for maintaining state information relating to previously transmitted communication request messages which have been transmitted;
said state information including information relating to whether selected previous communication request messages included filter parameters.

38. The system of claim 29 wherein the access network corresponds to a Digital Video Broadcasting (DVB) network, the communication request message corresponds to a Sign-on Request message transmitted from an interactive network adaptor (INA) to at least one network interface unit (NIU), and wherein the filter parameters correspond to address filter parameters.

39. The system of claim 38 further comprising means for using address filter parameters in Sign-On request messages to reduce numbers of NIUs contending for access to the Head End via the communication channel.

40. The system of claim 38 comprising means for using address filter parameters in Sign-On Request messages to prevent selected groups of NIUs from being able to respond to the Sign-On Request messages in order to reduce chances of at least one Sign-On Response message collision on the communication channel.

41. The system of claim 29 wherein the communication channel is contention-based.

42. The system of claim 29 wherein the communication channel is configured to utilize a Time Division Multiple Access communication protocol, and wherein at least a portion of timeslots of the communication channel are contention-based.

* * * * *